G. B. WAITE.
TIRE PROTECTOR.
APPLICATION FILED JULY 1, 1915.
1,329,482.
Patented Feb. 3, 1920.
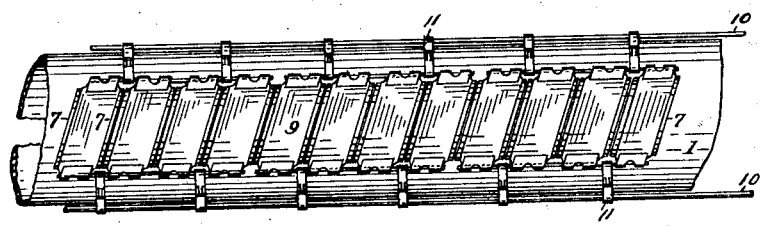
Fig. 2.
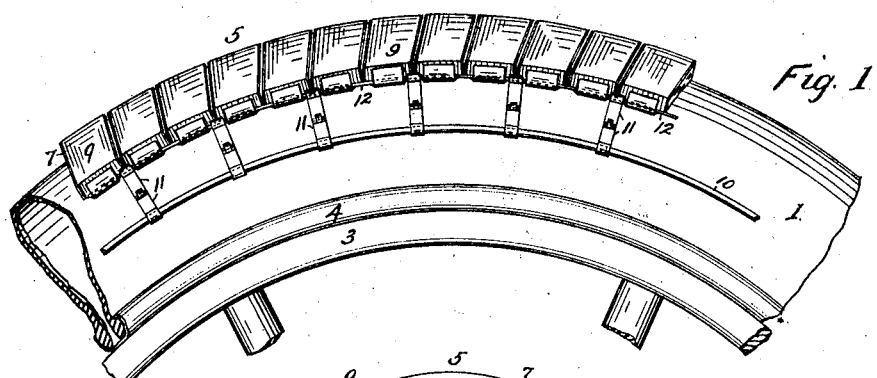
Fig. 1.
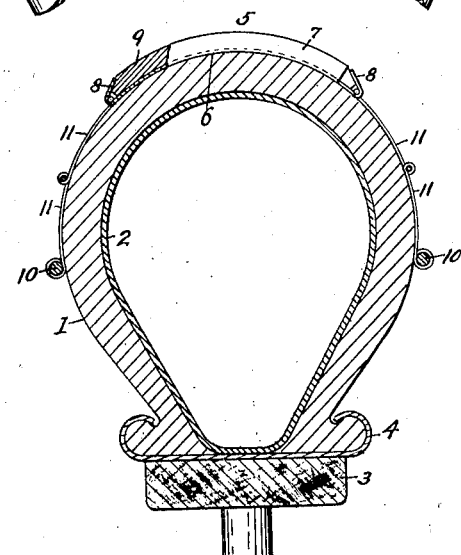
Fig. 3.
Fig. 4.
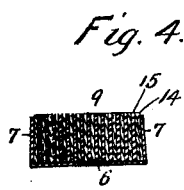
Witnesses:
C. W. Lovell
J. A. Eades.
Inventor
Guy B. Waite
By Attorney Wm Dodge

UNITED STATES PATENT OFFICE.

GUY B. WAITE, OF NEW YORK, N. Y.

TIRE-PROTECTOR.

1,329,482.          Specification of Letters Patent.          Patented Feb. 3, 1920.

Application filed July 1, 1915. Serial No. 37,494.

*To all whom it may concern:*

Be it known that I, GUY B. WAITE, a citizen of the United States, and resident of New York, in the county of New York and State of New York, have invented certain new and useful Improvements in Tire-Protectors, of which the following is a specification.

The invention relates to tire protectors arranged for detachable connection to pneumatic tires, and the objects of the same are to provide a protecting cover or tread extending circumferentially around and secured upon the wearing portion thereof, consisting of closely spaced narrow tread-blocks seated transversely on the tire, and adapted to preserve the normal elasticity of the latter, guard against excessive wear, puncture or other injury thereof, and furthermore to form a more efficient traction surface in which the severally arranged sections present detached ground contacts which not only serve to effectively prevent side skidding on slippery surfaces, but also offer less resistance to propulsion in obviating the manifest suction from the continuous surface of an ordinary tire when in direct contact with the ground under its ordinarily flattened working condition. The objects also include a protector covering only the tread portion of the tire whereby the heating effect therefrom is reduced to a minimum; also to secure the same in position by connections suitably constructed both for maintaining proper adjustment of parts while the tire is deflated and for affording a flexible clamping means acting directly upon the tire when the latter is inflated. The invention further provides traction members of particular construction, and means for detachably securing the same within the blocks for the purpose of renewal; and also includes the arrangement of the tread-blocks upon the tire to effect a self cleaning action for preventing the accumulation of road matter thereon.

In describing the invention in detail reference is had to the accompanying drawings forming a part of this specification, and wherein like characters of reference are used to designate corresponding parts throughout the several views, and in which:

Figure 1 is a side view of a portion of a wheel-tire shown in connection with the protector as embodied in the present invention; Fig. 2, a plan view of the same, showing a modification in the means for connecting the protector sections together; Fig. 3, an enlarged transverse section through the tire; and Fig. 4 is an enlarged transverse sectional view of a tread-block section.

In the drawings, numeral 1 designates an ordinary pneumatic wheel-tire, provided with the usual inner tube 2 and secured in well-known manner to the wheel-felly 3 by the rim 4. Extending circumferentially around the tire and seated transversely thereon are a plurality of narrow tread-blocks 5, comprising imperforable metal frames, each thereof having a seat 6, conforming with the transverse contour of the tread portion of the tire, and formed with outwardly-extending side flanges or ribs 7, slightly inclined toward each other. The opposite ends of the frames are outwardly bent and inclined toward each other to form loop-ends and retaining flanges 8, for receiving the hinge-pins 12, and also serving to secure the ends of the traction members 9, which ends extend below the flanges and adjacent to the terminals of the loop-ends for laterally positioning the hinge-pins, the traction members being also held along their opposite sides by the flanges 7. The marginal contraction of the retaining members of the tread-blocks present spaces into which the compressible traction members may be securely held under normal working conditions, and which, with a suitable tool, may be readily removed and renewed.

The traction members 9 consist of fabric strips 14 cemented together or vulcanized with interposed layers of rubber or other elastic adhesive material 15, and jointly form a yieldable body presenting an edgewise traction or wearing surface of great durability, the parts thereof being supported against disintegration or separation by the flanges formed on the tread blocks. Under normal working conditions the combined weight and movement exerted upon this traction surface cause a definite mobility between the united parts which tend to displace and repel the ordinary adhering road matter and thus maintain a substantially uniform tractive tread. To furthermore increase the repellent action against road accumulations the tread blocks may be disposed obliquely upon the tire and in the path thereof serve in conjunction with the angularly arranged side ribs 7 in a screw-like manner to laterally urge such foreign matter clear of the tire to better resist side slipping and preserve a uniformly effective wearing surface.

As clearly shown in Fig. 4 of the drawing, which is a transverse sectional view, the layers of the tread fabric are secured together and positioned in the frames to lie with their lengths extending transversely of the tire, so that, as the tire moves over the road, the layers of fabric will be presented successively thereto, and form a succession of individual transverse gripping edges to engage the road. As thus positioned, the layers will grab the slightest rough surface in the road and prevent the wheels from slipping, and thereby secure a better traction hold than if the layers were extended longitudinally of the tread, which is the well known manner of arranging fabric tread layers to a tire.

Owing to the compressible or compactible nature of the fabric layer tread, it has been found necessary to provide a holding frame having a rigid closed bottom, so that the fabric will compress and wear evenly. Otherwise, with a non-rigid bottom for a support, such as a flexible base or the surface of the tire, the fabric will be pressed into the weaker spots with a consequence of wearing away the portion of the tread or fabric which is not depressed to the same extent.

The traction members being formed with fabric strips or layers connected together, form segments of equal width having vertical sides. Thus when they are placed in the metal frames, and pressure is applied to the side flanges, the top edges of said side flanges are bent farther inwardly than the lower portions thereof, and this slightly inclines the side flanges inwardly, so that they compress the material of the traction members with an increasing degree of tightness from the bottom toward the top, thereby wedging the traction members within the frames by unequal compression. This avoids the necessity of forming the traction members wedge-shaped before they are applied to the frames.

The traction members being formed with fabric strips or layers connected together, provide blocks of equal width and having vertical sides, before they are inserted in the metal frames, and after they are placed in the metal frames, the side-flanges of the frames are pressed inwardly to incline them toward each other and in tight engagement with the sides of the fabric block. The top edges of the flanges being pressed inwardly farther than the lower portions thereof, necessarily compress the material of the traction members tighter at the top than at the bottom, or with an increasing degree of tightness from the bottom toward the top, with a result of wedging the traction members in the metal frames.

The fabric blocks are thus firmly secured in the frames, and in practical use, it has been found to be impossible to pull the blocks from the frames by road contact, and furthermore, the fabric layers will not separate, nor disintegrate, but to the contrary, the fabric material will compact tightly in the frames and form hard and durable traction members which will not wear smooth, but retain their anti-slipping qualities.

While the tread blocks may be secured to the tire or wheel-rim by well-known methods, I have herein shown a pair of concentrically arranged annular rods 10, disposed on opposite sides of the tire, and at intervals along the rods are hingedly jointed one end of the flexible multiple-link connections 11, the opposite ends thereof being hinged to the loop-ends 8 of the tread blocks by the hinge-pins 12, the latter serving to connect the blocks together in flexible series, adapted not only for convenience in handling but for maintaining proper adjustment of the parts when the tire is deflated, the several connecting parts being proportioned and disposed with respect to its several flexible joints to closely engage and firmly clamp the tire when inflated and firmly secure the tread-blocks thereon.

As above set forth it will be evident that the protector in its application to a pneumatic tire will serve in an efficient manner to secure the advantages described.

What I claim as my invention and desire to secure by Letters Patent, is:

1. A tire protector, comprising a plurality of tread-blocks each of which embody a relatively narrow metal frame formed to extend transversely of the tire and provided with a bottom, and outwardly projecting sides which are also formed to extend transversely of the tire, and a plurality of fabric layers secured together and seated in each frame, said fabric layers being secured in said frame by the inward pressure of said sides which are forcibly bent into engagement with the sides of said fabric layers to compress them laterally and bind them in position on the bottom of the frame, and means formed at each end of said frames for detachably securing them upon a tire.

2. A tire protector, comprising a plurality of tread-blocks and means for securing them to the tread of a tire, each of said tread-blocks embodying a metal frame having a closed bottom provided with integral outwardly projecting sides, and ends which are separate and independently bendable relative to said sides, and a compressible traction member confined upon said closed bottom and retained thereon by the clamping action by the bendable parts of the frame.

3. A tread block for tire protectors, comprising a compressible traction member formed of a plurality of fabric layers secured together side by side to provide a yieldable body, and a metal frame constructed to extend transversely of a tire and inclosing the sides and bottom of said compressible traction member to support it on a tire, and at the same time providing a rigid receptacle into which the material of the traction member can be compressed, and compacted therein by its engagement with the road, said frame also preventing the separation of the layers of fabric, and the spreading and disintegration of the material thereof, the layers of fabric being seated edgewise on the bottom of the frame to present their opposite edges to the road.

4. A tread block for tire protectors, comprising a metal frame having a bottom and outstanding bendable sides, and a traction member composed of fabric layers seated edgewise on said bottom and compressed together by said bendable sides to secure it in the frame, said metal frame providing a rigid receptacle to allow the material of the traction members to be compacted therein by its engagement with the road.

Signed at New York, in the county of New York and State of New York, this 29th day of June, A. D. 1915.

GUY B. WAITE.

Witnesses:
CHAS. W. LA RUE,
JOHN A. EADES.